US006209705B1

(12) United States Patent
Drewitz

(10) Patent No.: US 6,209,705 B1
(45) Date of Patent: Apr. 3, 2001

(54) CONTAINER TRANSPORT SYSTEM

(75) Inventor: Hugues Drewitz, St-Eustache (CA)

(73) Assignee: Kalish Canada Inc. (CA)

( * ) Notice: Subject to any disclaimer, the term of this patent is extended or adjusted under 35 U.S.C. 154(b) by 0 days.

(21) Appl. No.: 09/252,413

(22) Filed: Feb. 18, 1999

Related U.S. Application Data

(62) Division of application No. 08/744,538, filed on Nov. 6, 1996, now Pat. No. 5,881,429.

(51) Int. Cl.[7] .................................................... B65G 47/24

(52) U.S. Cl. ............................ 198/404; 15/304; 134/62; 134/166 R

(58) Field of Search ............................ 198/404, 457.01, 198/457.05, 604, 611; 134/62, 68, 152, 166 R; 15/304, 309.2, 345

(56) References Cited

U.S. PATENT DOCUMENTS

| | | | | |
|---|---|---|---|---|
| 2,073,746 | | 3/1937 | Keller . | |
| 2,879,882 | * | 3/1959 | Whelan | 198/404 |
| 2,915,773 | | 12/1959 | Whelan . | |
| 2,967,321 | | 1/1961 | Whelan . | |
| 2,980,938 | | 4/1961 | Whelan . | |
| 3,060,481 | | 10/1962 | Whelan . | |
| 3,071,497 | | 1/1963 | Hinson . | |
| 3,208,613 | | 9/1965 | Brainard . | |
| 3,226,757 | | 1/1966 | Shea . | |
| 3,964,123 | | 6/1976 | Pettersson . | |
| 3,983,597 | | 10/1976 | Nuemann . | |
| 4,017,330 | | 4/1977 | Aidlin et al. . | |
| 4,208,761 | | 6/1980 | Ionescu . | |
| 4,313,767 | | 2/1982 | Bemis et al. . | |
| 4,423,745 | * | 1/1984 | Butt et al. | 134/62 |
| 4,461,054 | | 7/1984 | Oehlenschlager et al. . | |
| 4,701,973 | | 10/1987 | McBrady et al. . | |
| 4,883,542 | | 11/1989 | Voneiff . | |
| 4,987,630 | | 1/1991 | Allen et al. . | |
| 5,076,303 | | 12/1991 | McBrady . | |
| 5,113,545 | | 5/1992 | Avelis . | |
| 5,265,298 | | 11/1993 | Young . | |
| 5,279,017 | | 1/1994 | Foreshaw . | |
| 5,388,304 | | 2/1995 | Takada . | |
| 5,428,861 | | 7/1995 | Heard et al. . | |
| 5,464,483 | | 11/1995 | Avelis et al. . | |
| 5,487,200 | | 1/1996 | Herzog . | |
| 5,490,300 | | 2/1996 | Horn . | |
| 5,881,429 | * | 3/1999 | Drewitz | 15/304 |

FOREIGN PATENT DOCUMENTS

| | | |
|---|---|---|
| 697247 | 11/1964 | (CA) . |
| 1209904 | 10/1963 | (DE) . |
| 3605640 | 8/1987 | (DE) . |
| 1349525 | 1/1963 | (FR) . |
| WO 86/02343 | 4/1986 | (WO) . |

* cited by examiner

*Primary Examiner*—Jospeh E. Valenza
(74) *Attorney, Agent, or Firm*—Ratner & Prestia

(57) ABSTRACT

The invention relates to a portable apparatus for cleaning containers that can be installed alongside a conventional conveyor belt on which containers are transported. The cleaning apparatus comprises a container pick-up station designed to direct oncoming containers toward a local transport system designed to transport the containers through various container processing stages. The container processing stages include a first station that blasts ionized gas into the container to place contaminants in suspension and a second station that sucks out the suspended contaminants from the container. Once the container processing has been completed, the container is transported to a container return station that directs the container onto the conveyor.

14 Claims, 5 Drawing Sheets

CONTAINER TRANSPORT SYSTEM

This application is a divisional of U.S. patent application Ser. No. 08/744,538, filed on Nov. 6, 1996, now U.S. Pat. No. 5,881,429.

FIELD OF THE INVENTION

The present invention relates in general to a container cleaning apparatus and more particularly to a cleaning apparatus that can be installed alongside a conveyor belt system. The apparatus is particularly well suited for cleaning empty containers of different sizes and shapes, and it can be installed at a selected location alongside an existing conveyor system or material-handling device designed to transport such containers. The container cleaning apparatus can be put in use with few if not any modifications to the existing conveyor belt.

BACKGROUND OF THE INVENTION

In the container industry, particularly where drugs or other edible materials are stored in bottle-like containers, it is necessary to subject the container to a cleaning process to remove any particulate contaminants such as dust that may be electrostatically attracted to the inner walls of the container.

To remove those contaminants, it is common practice to subject the containers to a cleaning operation. Typically, the containers transported on a conveyor belt are directed to a cleaning station that injects in the interior of the container an ionized high-velocity air stream to neutralize the electrostatic field that may exist on the walls of the container and place the contaminants attracted to it in suspension. Next a powerful negative pressure zone is created near the container mouth to suck away the suspended contaminants.

Existing container cleaning stations are fixed devices designed to be an integral part of the container processing line. Sometimes, a production run may not need to have containers cleaned, rendering the cleaning station not necessary. In those cases the presence of the cleaning station may be detrimental to operation of the processing line, as it may reduce the processing speed of the containers. Such a drawback, however, is unavoidable as the cleaning station can not be readily removed from the conveyor system.

Thus, there is a need in the industry to provide a cleaning station that is portable and can easily be incorporated into a conveyor system on which containers are transported.

OBJECTIVES AND STATEMENT OF THE INVENTION

It is a general object of the present invention to provide an improved cleaning apparatus for removing particulate contaminants from the interior of a container.

It is a further object of the invention to provide a container cleaning apparatus that is portable and may be readily installed alongside an existing conveyor system.

It is another object of the invention to provide a cleaning apparatus that can adjust to accommodate containers of different sizes without having to change pieces.

It is another object of the invention to provide a cleaning apparatus with an improved internal container transport system.

It is a further object of the invention to provide a cleaning apparatus that inverts the containers upside down (the mouth of the container facing down) to perform the cleaning operation.

As embodied and broadly described herein, the invention provides a portable container cleaning apparatus, that can be installed alongside a conveyor belt said apparatus comprising:

- a container pick-up station capable of cooperating with a conveyor belt on which containers to be cleaned are transported to remove containers from the conveyor belt, said container pick-up station including a guide panel that can be extended across the conveyor belt and a rotating support surface to cause a container removed from the conveyor belt to travel along a sector of a circle;
- a container transport system including an entry zone in the vicinity of said rotating support surface, said container transport system being capable of taking-up a container transported by said rotating surface along said sector of a circle and carrying the container along a predetermined path of travel, said container transport system also including an exit zone where a container is released;
- a first station located for introducing in the container a high velocity gas stream for placing contaminants present in the container in suspension;
- a second station located downstream from said first station with relation to a direction of movement of the container along said path of travel, said second station being capable of establishing a negative pressure zone to cause contaminants placed in suspension in the container to be removed by suction; and
- a container return station located in the vicinity of said exit zone, said container return station including a guide panel that can be extended across the conveyor belt and a rotating surface capable of subjecting a container delivered from said exit zone to a movement along a path of travel along a sector of a circle, said container return station being capable of cooperating with the conveyor belt to return the container to the conveyor belt.

In a preferred embodiment, the container pick-up station includes a guide panel positioned to extend across the conveyor belt to direct oncoming containers onto a rotating table of the cleaning apparatus. The rotating table reverses the movement of the container so it is caused to travel in a direction opposite to that on the conveyor belt. An internal transport system grasps the container and transports it along a semi-circular path to invert it so its mouth faces down. A spray jet is located beneath the container and ejects a continuous powerful air stream that enters the mouth of the container to place in suspension any contaminants adhered to the inner walls of the container. A vacuum port immediately beneath the container sucks the suspended particulate material out from within the container. The internal transport system then directs the container to a return station that contains a rotating table orienting the container so it moves along the same direction as that of the conveyor. A guide panel assists in the transfer of the container from the cleaning apparatus to the conveyor belt.

In a most preferred embodiment, the internal transport system comprises two adjustable resilient belts that run alongside one another, one container width apart. The distance between the belts can be adjusted to accommodate containers of different sizes. The belts possess some degree of resiliency to insure a tight fit, and have a high coefficient of friction to prevent slippage between the belts' surfaces and the containers. Besides transporting the containers, the belts are designed to impart rotary movement to the rotating tables. The belts are driven by an electrical motor or any other suitable power source.

Advantageously, the gas injected into the container is ionized so that it will neutralize electrostatic charges on the inner surface of the container to prevent particles from electrostatically clinging to the container's walls.

As embodied and broadly described herein the invention further provides a container cleaning apparatus, said apparatus comprising:

- a container pick-up station capable of cooperating with a conveyor belt on which containers to be cleaned are transported in a mouth-facing-up condition, to remove a container from the conveyor belt,
- a container transport system including an entry zone in a vicinity of said container pick-up station, said container transport system being capable of taking-up at said entry zone a container transported by said container pick-up station and carrying the container along a predetermined path of travel, said container transport system also including an exit zone where a container is released, said predetermined path of travel including:
  - a first run for orienting the container such that the mouth of the container faces down;
  - a second run downstream of said first run for transporting the container with the mouth of the container facing down;
  - a third run downstream of said second run for orienting the container such that the mouth of the container faces up;
- a first station located along said path of travel for introducing in the container a high velocity gas stream for placing contaminants present in the container in suspension;
- a second station located along said path of travel for establishing a negative pressure zone to cause contaminants placed in suspension in the container to be removed by suction; and
- a container return station located the vicinity of said exit zone, said container return station being capable of cooperating with the conveyor belt to return the container to the conveyor belt in a mouth-facing-up condition.

DESCRIPTION OF A PREFERRED EMBODIMENT

Figure 1:
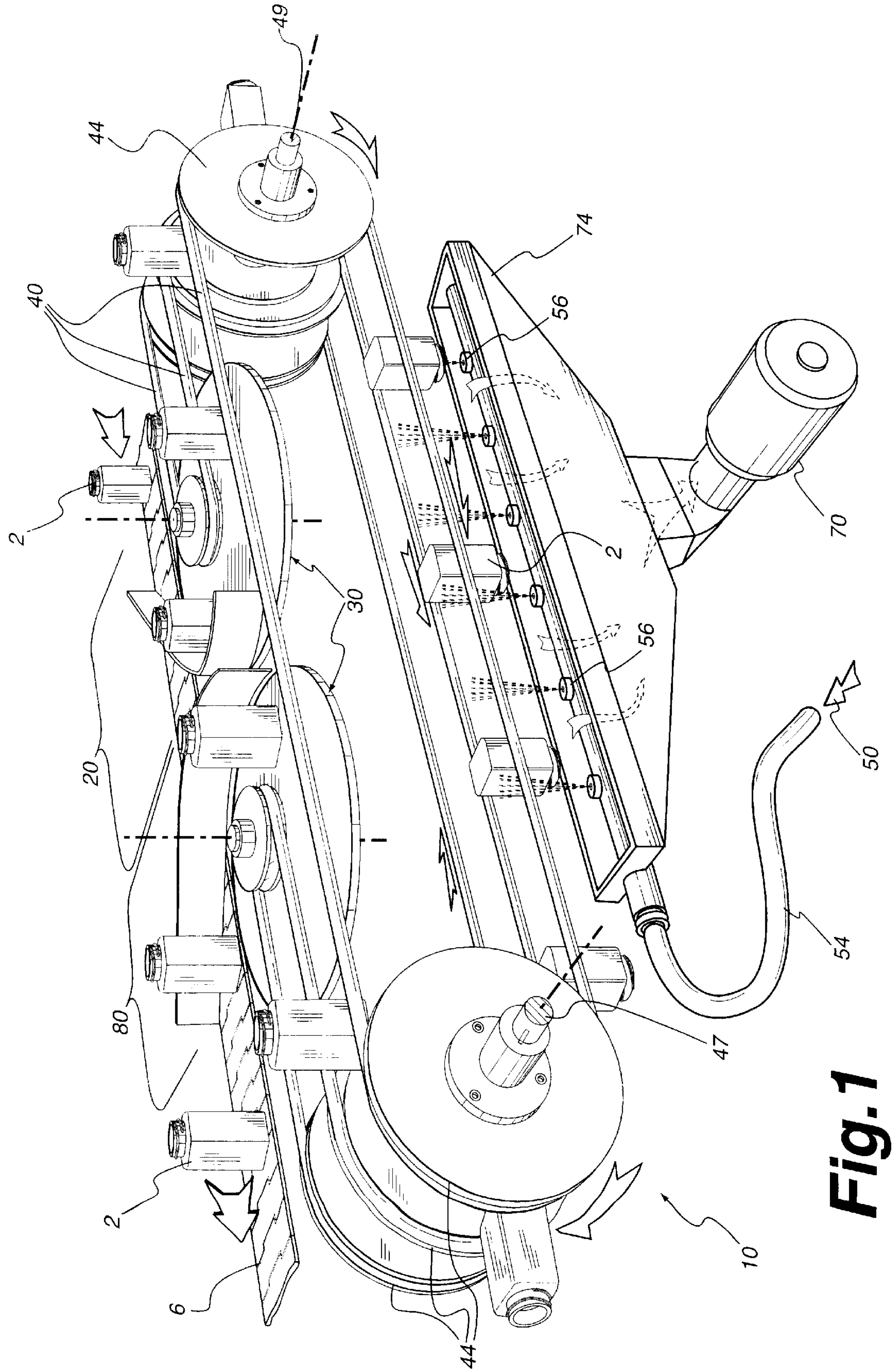
FIG. 1 is a perspective view of the container cleaning apparatus in accordance to the invention placed alongside a conveyor belt.

Referring now to the drawings, FIG. 1 illustrates an improved container cleaning apparatus 10 that can be installed alongside a conveyor belt 6. The cleaning apparatus comprises three main components, namely: a container pick-up station 20 designed to remove a container 2 from the conveyor belt 6 and convey it to an internal transport system 40 that moves the container through a container processing station that incorporates an air jet system 50 for generating a high velocity air stream, a vacuum port 70 to establish a negative pressure zone and finally, a container return station 80 that directs the cleaned containers back to the conveyor belt 6.

Figure 2:
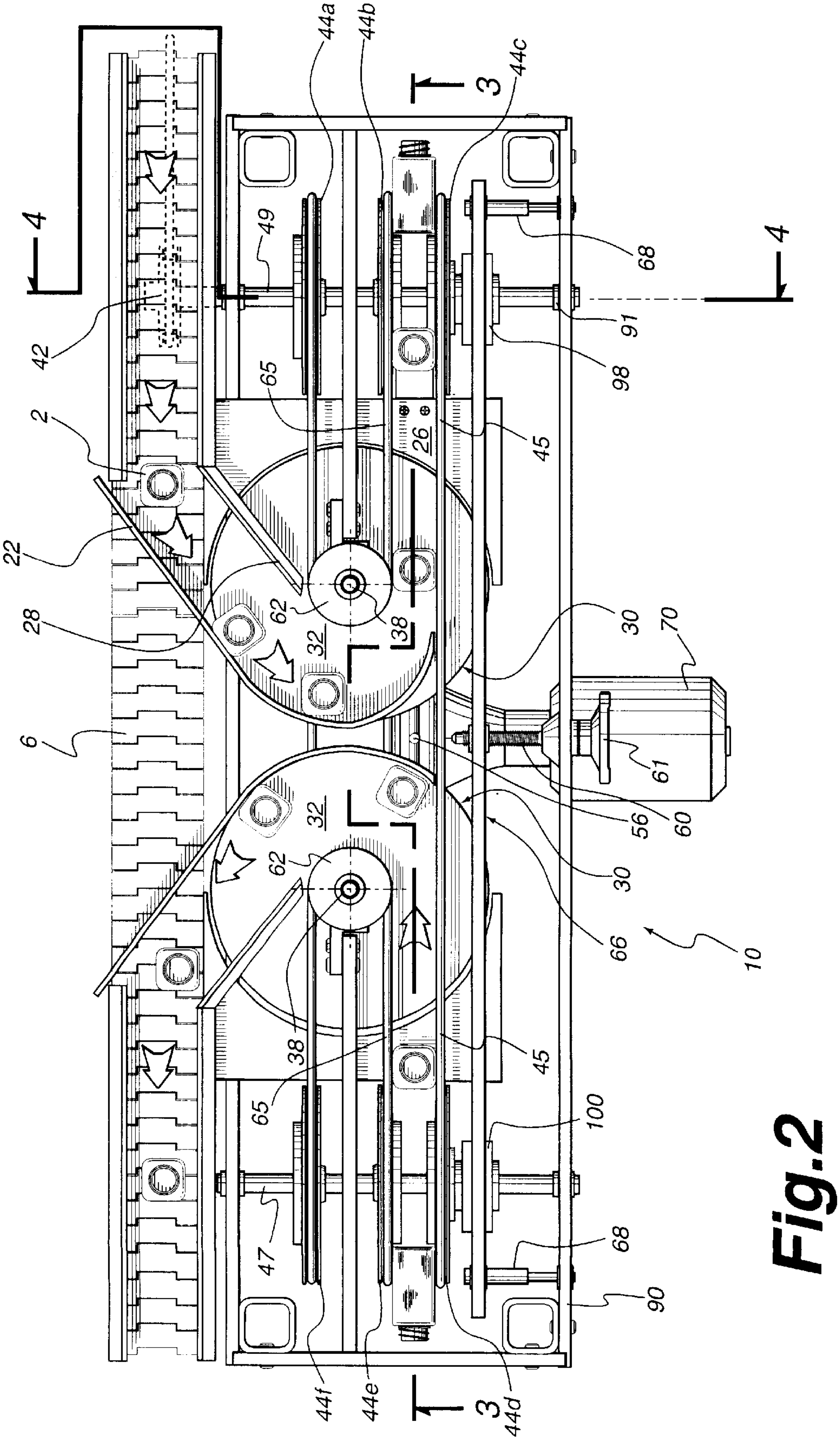
FIG. 2 is a top elevational view of the cleaning apparatus.

As best shown in FIG. 2, the container pick-up station 20 comprises a guide panel 22 that directs oncoming containers 2 onto a rotating table 30 that feeds them to the container transport system 40. The guide panel 22 that extends across the conveyor belt 6 is preferably placed at an angle of 45 degrees with respect to the longitudinal axis of the conveyor belt and comprises a curved portion fixed to the frame 90 of the apparatus 10. The guide panel is fabricated of a material that generates minimal friction upon contact with the containers without scratching them, preferably a plastic composite.

Figure 3:
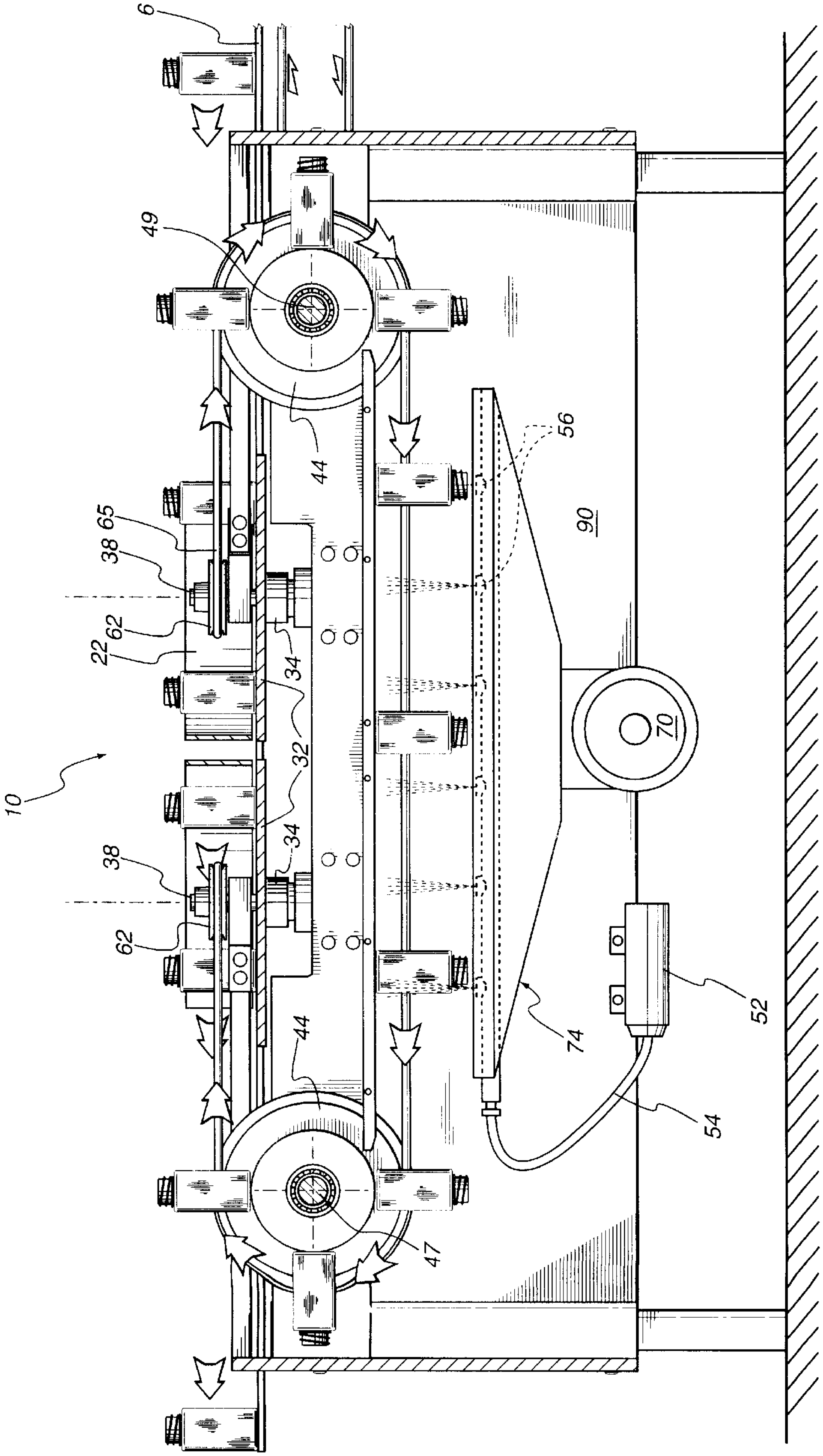
FIG. 3 is a cross sectional view taken along the lines 3—3 in FIG. 2.

The rotating table 30 of the container pick-up station as best seen in FIGS. 2 and 3, comprises a circular base 32 and hub 34. The circular base 32 has a radius that is much larger than the diameter of a container 2. A rotating shaft 38 is keyed to the circular base and to the hub 34. The lower and intermediate portions of the shaft are fixed to respective bearings (not shown) secured to the frame 90 of the cleaning apparatus 10. The upper portion of the shaft is mounted to a pulley 62, extending above the circular base 32, with a U-shaped cavity that receives belt 65. The belt 65 drives the pulley 62 that rotates the shaft 38 which in turn causes the rotating table 30 to turn. Both the rotating table 30 and pulley 62 are preferably fabricated of aluminum while the shaft 38 is preferably made of stainless steel.

To provide a smooth uninterrupted surface over which containers can be moved between the conveyor belt 6 and the container cleaning apparatus 10, a bottom plate 26 fills the gaps between the conveyor 6 and rotating table 30. Moreover, a side panel 28 also extends from the inner edge of the conveyor belt toward the center of the rotating table 30. The side panel in conjunction with the guide panel 22 form a channel that directs the containers from the conveyor belt toward the table 30. The side panel is fabricated of material that generates little friction, preferably a plastic composite.

As best seen in FIG. 2, the transport system 40 comprises two belts 45 and 65, support pulleys 44*a*, 44*b*, 44*c*, 44*d*, 44*e*, 44*f*, shafts 47 (supporting pulleys 44*d*,44*e*,44*f*) and 49 (supporting pulleys 44*a*,44*b*,44*c*), an adjustment screw 60 and transmission 42. The support pulleys 44 are preferably fabricated of aluminum and shafts 47 and 49 are preferably stainless steel. The belts 45 and 65 are approximately 1 inch in diameter, they have a circular cross-section and are made of a flexible material that has a high coefficient of friction and some degree of resiliency, preferably urathene.

Figure 4:
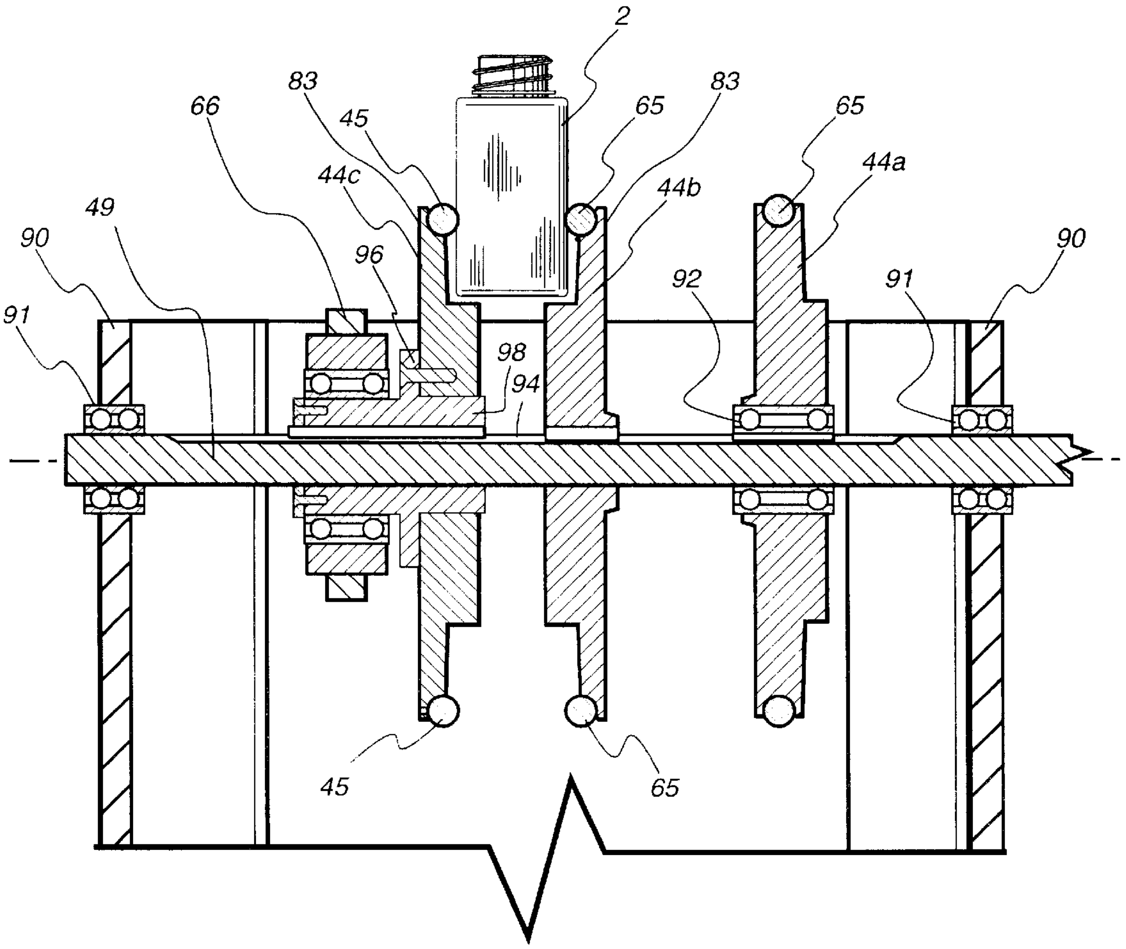
FIG. 4 is a partial cross-sectional view taken along the lines 4—4 in FIG. 2.

As best seen in FIG. 4, support pulley 44*a* and support pulley 44*f* that is not shown, have a groove of semi-circular cross-sectional shape within which the belt 65 is received. Support pulleys 44*b*, 44*c*, and support pulleys 44*d* and 44*e* that are not shown in FIG. 4, have an arch-shaped recess along their peripheral edge within which belts 45 and 65 are fitted. Thus, the belts 45 and 65 project outward beyond the surface of the pulley. This allows the surfaces of the belts to engage the side walls of the containers while providing a sufficient clearance between the container 2 and the main surfaces of the support pulleys 44. The belts 45 and 65 are held in place on the shallow arch-shaped recesses by virtue of the tension built into the belts. It is therefore desirable to install the belts 45 and 65 tightly to avoid any accidental disengagement of the belts from the pulleys. It should also be noted that the pulleys 44*c*, 44*b*, 44*d* and 44*e* are configured to provide L-shaped recesses 83 in which the containers can fit while passing through the pulleys.

Horizontal shaft 49 that supports pulleys 44*a*, 44*b* and 44*c* is mounted for rotation to the frame 90 in two support bearings 91 and it is driven by a transmission 42. The transmission 42 may include gears, belts and/or chains that transmit power from an electric motor (not shown in the drawings) to the shaft 49. The structure of the transmission will not be described with more details because it is of conventional construction.

Support pulley 44*a* rotates freely about a bearing 92 that is secured to the shaft 49. This arrangement thus allows a relative angular movement between the pulley 44*a* and the shaft 49. Support pulley 44*b* is keyed to the shaft 49 which causes the pulley 44*b* to rotate with the shaft 49. In other words, the pulley 44*b* is locked against any angular movement relative to the shaft 49. Support pulley 44*c* is also driven by the shaft 49, but is adjustable along the longitudinal axis of the shaft. This is achieved by fastening support pulley 44*c* to a projecting flange portion 96 of a collar 98. The collar 98 is capable of sliding along the shaft 49 but not turning thereon. This can be achieved by forming on the surface of the shaft 49 an elongated keyway 94 in which is slidingly received a key (not shown in the drawings) projecting in the bore of the collar 98 in which the shaft 49 is fitted. This arrangement allows varying the longitudinal position of the pulley 44*c* on the shaft 49 while causing the pulley 44*c* to turn when a rotational movement is imparted to the shaft 49. The collar 98 is mounted to a plate 66 that can be displaced to produce the longitudinal movement of the collar.

Support pulleys 44*e* and 44*f* both freely rotate on their respective bearings (not shown in the drawings but identical to the bearings 92) about the horizontal shaft 47 that itself is capable of free rotation in two support bearings (not shown in the drawings but identical to the bearings 91) mounted to the frame 90 of the apparatus 10. Support pulley 44*d* rotates freely about shaft 47 and is secured by a collar 100 allowing to move the pulley 44*d* to move longitudinally along shaft 47. Contrary to the collar 98, the collar 100 is not keyed to the shaft 47 as it is allowed to freely rotate on the shaft. Also note that the collar 100 is mounted to the plate 66.

As best seen in FIG. 2, a handle portion 61 of the adjustable screw 60 moves the plate 66 along supporting guides 68 to displace collars 98 and 100 and correspondingly pulleys 44*c* and 44*d* along their respective shafts. In effect, this moves belt 45 to a desired distance apart from belt 65, thus allowing adjustment of the inter-belt distance to set the transport system for a particular container width.

As is best seen in FIG. 3, an air jet system 50 is provided comprising a housing 52, a supply conduit 54 and a series of nozzles 56. The housing contains a suitable device known by those skilled in the art to ionize air and propel it through supply conduit 54 and out through nozzles 56. The housing 52 is mounted to the frame 90 of the apparatus by any appropriate means, such as bolts and the supply conduit 54 extends from the housing through an aperture in a funnel shaped conduit 74 having an open top in which a zone of low pressure is created. The low pressure zone is created by a suction device or vacuum port 70 known by those skilled in the art to suck air from the open top wall of the funnel shaped conduit.

As best seen in FIGS. 2 and 3, the final container return station 80 is a mirror image of the container pick-up station. It comprises a rotating table 30 with a circular base 32 and hub 34 through which a shaft 38 is keyed and mounted for rotation on two bearings (not shown in the drawings). A pulley 62 is mounted to the top portion of the shaft 38 and a belt 65, positioned within a groove in the pulley, drives the pulley so as to rotate table 30. A guide panel 22 extends across the width of the conveyor belt 6 at a preferred angle of 45 degrees with respect to the longitudinal axis of the conveyor. The guide panel 22, together with a floor panel or bottom plate 26 and a side guide or panel 28 all assist in directing the containers 2 smoothly onto the conveyor belt 6.

In operation, the portable cleaning apparatus 10 is installed alongside the conveyor belt 6 on which upright containers 2 are transported. The guide panel 22 of the container pick-up station intercepts the containers 2 on the conveyor belt 6 and directs them onto the counterclockwise rotating table 30 that feeds them to an entry zone of the internal container transport system 40 (between two belts 45 and 65). The rotating table 30, with the assistance of the guide panel 22, reverses the movement of the incoming container 2 so it is caused to travel in a direction opposite to that on the conveyor belt 6.

The rotating table 30 directs the container 2 to an entry zone of the container transport system 40 comprising two resilient belts 45 and 65 which run alongside one another at one container width apart. The belts grasp the oncoming container 2 and transport the container along a first run where it follows a semi-circular path around pulleys 44*b* and 44*c*, so as to be inverted with its mouth facing down. The container, in its inverted position, is then transported along a second straight run where it passes over the funnel conduit 74 and is subjected to a powerful spray of ionized air generated by the series of nozzles 56. The ionized air enters the mouth of container 2 and neutralizes electrostatic charges on its inner walls. This prevents particulate contaminants, such as dust particles, from electrostatically clinging onto the walls of the container. The mechanical agitation generated by the turbulent air flow also places the contaminants into suspension. When the container is located between adjacent nozzles 56 it is subjected to the negative pressure zone established within the funnel by the suction device or vacuum port 70. At that point, particulate contaminants placed in suspension are sucked out. Thus, every time the container passes over a nozzle it is subjected to a blast of ionized air and immediately afterwards to suction. This provides a plurality of blast/suction cycles that contribute to thoroughly clean each container.

The container which is now free of contaminants is transported along a third run where it follows a semi-circular path around support pulleys 44*d* and 44*e* so as to be oriented with its mouth facing up. The container is then transported to a final transport zone where it is released onto the container return station. The container return station comprises the second counterclockwise rotating table 30 which, with the assistance of the guide panel 22, directs the container onto the conveyor belt 6.

The transmission system 42 provides a synchronized, linear relationship between the speed of the conveyor belt 6 and the speed of the cleaning apparatus 10. In short, an electric motor transmits rotation power to a transmission 42 connected to shaft 49. Shaft 49 turns support pulleys 44*b* and 44*c* which respectively drive the belts 65 and 45. More specifically, driven belt 65 which extends along a predetermined path traced by pulleys 62,44*a*, 44*b*, 44*f* and 44*e*, rotates pulleys 62 which in effect, rotates tables 30. Moreover, driven belt 45, which extends along a path traced by pulleys 44*c* and 44*d*, provides a side support along which to transport the container 2 through three runs. Both belts move at the same linear speed.

Figure 5:
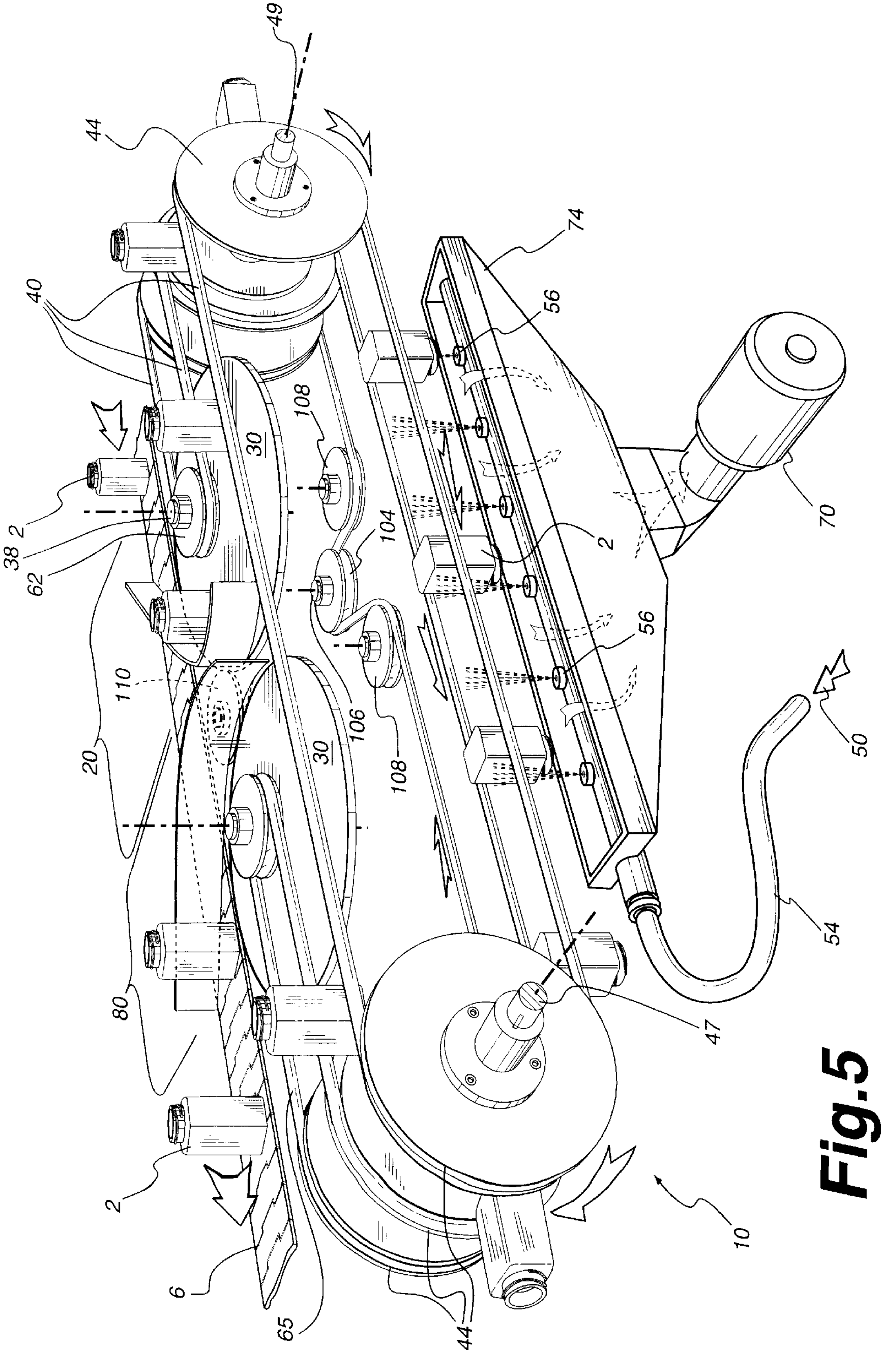
FIG. 5 is a perspective view of a variant of the container cleaning apparatus.

In a variant, the tables 30 may be driven by a friction wheel rather than by pulleys 62. More specifically as best seen in figure 5, a friction wheel 110 is provided to engage the periphery of both tables 30. The pulleys 62 are modified to turn freely on the shaft 38 rather than being keyed to them. The belt 65 is re-routed so as to rotate a pulley 104 which is keyed to a shaft 106 that rotates the friction wheel 110. Two idler wheels 108 guide the belt 65 and provide the appropriate tension so as to grip pulley 104 and prevent slippage thereon. As the pulley 104 turns, it drives the friction wheel 110 that, in turn, causes both tables to rotate at a peripheral linear speed identical to the peripheral linear speed of the friction wheel 110.

The above description of a preferred embodiment of the invention should not be interpreted in any limiting manner as refinements and variations are possible without departing from the spirit of the invention. The scope of the invention is defined in the appended claims and their equivalents.

What is claimed is:

1. A container transport system comprising:

a first rotating surface defining an entry zone;

a second rotating surface defining an exit zone;

a pair of belts in a spaced apart relationship for engaging containers between said belts, said belts being movable to transport said containers and one of said belts engaging and being in operative relation with said first and second rotating surfaces to impart rotary movement to said first rotating surface and said second rotating surface;

a plurality of pairs of pulleys on which said belts are engaged, a first pair of pulleys causing said belts to travel in a direction such that a container retained between said belts is oriented with a mouth facing down, and a second pair of pulleys causing said belts to travel in a direction such that a container retained between said belts is oriented with a mouth facing up, one of said pairs of pulleys imparting motion to said belts such that all the pulleys of said container transport system have rotary movement;

a run between pairs of pulleys through which containers travel; and a plurality of free pulleys capable of rotating in two directions thereby allowing said belt, which imparts rotary movement to said first rotating surface and said second rotating surface, to travel in two directions.

2. The container transport system as defined in claim 1, wherein the distance between said belts is adjustable allowing said belts to receive containers of different sizes.

3. The container transport system as defined in claim 1, wherein said first rotating surface and said second rotating surface include pulleys on which said belt, which imparts rotary movement, is engaged.

4. The container transport system as defined in claim 1, wherein said first rotating surface and said second rotating surface further comprise guide panels that can be extended across a path of a conveyor system thereby causing said containers to travel along a sector of a circle defined by said guide panels.

5. The container transport system as defined in claim 1, wherein said first rotating surface removes containers from said conveyor system.

6. The container transport system as defined in claim 4, wherein said second rotating surface returns containers to said conveyor system.

7. The container transport system as defined in claim 1, wherein said containers travel through said run with a mouth of said containers facing down.

8. A container transport system comprising:

a first rotating surface defining an entry zone;

a second rotating surface defining an exit zone;

a pair of belts in a spaced apart relationship for engaging containers between said belts, said belts being movable to transport said containers and a first of said belts engaging and being in operative relation with said first rotating surface and said second rotating surface;

a plurality of pairs of pulleys on which said belts are engaged, a first pair of said pulleys causing said belts to travel in a direction such that a container retained between said belts is oriented with a mouth facing down and a second pair of said pulleys causing said belts to travel in a direction such that a container retained between said belts is oriented with a mouth facing up;

a friction wheel engaging said first rotating surface and said second rotating surface and imparting rotary motion to said first rotating surface and said second rotating surface;

a run between pairs of pulleys through which containers travel; and a plurality of free pulleys capable of rotating in two directions thereby allowing said first of said belts to travel in two directions.

9. The container transport system as defined in claim 8, wherein the distance between said belts is adjustable, thus allowing said belts to receive containers of different sizes.

10. The container transport system as defined in claim 8, wherein said first rotating surface and said second rotating surface include pulleys on which said first of said belts is engaged.

11. The container transport system as defined in claim 8, wherein said first rotating surface and said second rotating surface comprise guide panels that can be extended across a path of a conveyor system thereby causing said containers to travel along a sector of a circle defined by said guide panels.

12. The container transport system as defined in claim 11, wherein said first rotating surface removes containers from said conveyor system.

13. The container transport system as defined in claim 11, wherein said second rotating surface returns containers to said conveyor system.

14. The container transport system as defined in claim 8, wherein said containers travel through said run with a mouth of said containers facing down.

* * * * *